Patented July 21, 1925.

1,546,859

UNITED STATES PATENT OFFICE.

PAUL NAWIASKY AND EMIL KRAUCH, OF LUDWIGSHAFEN-ON-THE-RHINE, GERMANY, ASSIGNORS TO BADISCHE ANILIN- & SODA-FABRIK, OF LUDWIGSHAFEN-ON-THE-RHINE, GERMANY, A CORPORATION OF GERMANY.

BLACK VAT DYESTUFF.

No Drawing. Application filed June 3, 1924. Serial No. 717,537.

*To all whom it may concern:*

Be it known that we, PAUL NAWIASKY and EMIL KRAUCH, citizens, the first of Austria and the second of Germany, residing at Ludwigshafen-on-the-Rhine, Germany, have invented new and useful Improvements in Black Vat Dyestuffs, of which the following is a specification.

We have found that valuable vat dyestuffs dyeing from gray to black tints are obtained by subjecting nitrated dibenzanthrone to a treatment with sulfur, or an agent capable of supplying sulfur. The treatment can be effected with or without an addition of suitable transporters, such as copper oxid, antimony trisulfid and the like.

Products of particularly valuable properties are obtained by employing purified nitrodibenzanthrone as prepared in accordance with the Letters Patent No. 1,513,851, dated November 4, 1924.

The following examples serve to fully describe one mode of carrying the invention into effect but it is not intended to restrict the invention to these examples. The parts are by weight.

Example 1.

50 parts of nitrodibenzanthrone, prepared by nitrating dibenzanthrone as described in the specification of Patent 796,393 or in a similar manner, and purified by fractionally precipitating the nitro product from its solution in concentrated sulfuric acid, as more fully described in the specification of the Letters Patent No. 1,513,851, dated November 4, 1924, are heated together with 450 parts of sulfur and 5 parts of copper oxid, to about 240 degrees or 250 degrees centigrade. The molten mass is kept at this temperature, while stirring, until a test portion, when freed from sulfur by extracting with sodium sulfid solution and dyed from the vat, shows no longer an increase of the depth of the shade produced. The mass is then allowed to cool, comminuted and freed from unaltered sulfur by boiling with sodium sulfid solution. The dyestuff is further worked up in the usual manner and is obtained in the form of a black powder, soluble in concentrated sulfuric acid with a reddish violet coloration; in trichlorobenzene it dissolves difficultly from reddish violet to blue and with a cherry-red fluorescence. The dyestuff dyes cotton from its blue vat a blue shade which depending on the strength of the dyeing turns gray or black when exposed to the air.

Antimony trisulfid may be used instead of copper oxid, and a mixture of sulfur and sodium sulfid may be used instead of sulfur alone.

When raw nitrodibenzanthrone is employed in lieu of the purified product, a similar dyestuff having a slightly lesser coloring power is produced.

Example 2.

50 parts of nitrated dibenzanthrone (dyestuff traded as anthra green B) are boiled under a reflux cooler for 18 hours, together with 450 parts of sulfur, 750 parts of trichlorobenzene and 5 parts of antimony trisulfid. The reaction mass is then filtered while still hot and the precipitate freed from sulfur by boiling with trichlorobenzene. In the first stage of the reaction nitrous gases are evolved which it is advisable to avoid. This may be done by adding to the reaction mixture aromatic amines for example 10 parts of anilin.

We claim:

As a new article of manufacture, a vat coloring matter of the dibenzanthrone series, obtainable by treating nitrated dibenzanthrone with sulfur, being a black substance soluble in concentrated sulfuric acid with a reddish violet coloration and difficultly dissolving in boiling trichlorobenzene from reddish violet to blue and with a cherry-red fluorescence, and when vatted, giving a blue solution, from which cotton is dyed from gray to black shades, after exposure to the air.

In testimony whereof we have hereunto set our hands.

PAUL NAWIASKY
EMIL KRAUCH.

Witnesses:
WILHELM SCHERER,
ARTHUR DENONVILLE.